United States Patent
Fornos et al.

(10) Patent No.: US 11,318,678 B2
(45) Date of Patent: May 3, 2022

(54) PREPARING A BASE FOR ADDITIVE MANUFACTURING

(71) Applicant: HEWLETT-PACKARD DEVELOPMENT COMPANY, L.P., Houston, TX (US)

(72) Inventors: Pol Fornos, Barcelona (ES); David Ramirez Muela, Barcelona (ES); Sergio Puigardeu Aramendia, Barcelona (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 615 days.

(21) Appl. No.: 16/304,493

(22) PCT Filed: Jul. 4, 2016

(86) PCT No.: PCT/EP2016/065728
§ 371 (c)(1),
(2) Date: Nov. 26, 2018

(87) PCT Pub. No.: WO2018/006935
PCT Pub. Date: Jan. 11, 2018

(65) Prior Publication Data
US 2019/0291349 A1   Sep. 26, 2019

(51) Int. Cl.
*B29C 64/393* (2017.01)
*B33Y 10/00* (2015.01)
(Continued)

(52) U.S. Cl.
CPC .......... *B29C 64/393* (2017.08); *B29C 64/165* (2017.08); *B29C 64/209* (2017.08);
(Continued)

(58) Field of Classification Search
None
See application file for complete search history.

(56) References Cited

U.S. PATENT DOCUMENTS

| 6,399,010 B1 | 6/2002 | Guertin et al. |
| 7,815,826 B2 | 10/2010 | Serdy et al. |

(Continued)

FOREIGN PATENT DOCUMENTS

| CN | 103980698 | 8/2014 |
| WO | WO 2015106844 | 7/2015 |

(Continued)

OTHER PUBLICATIONS

"HP Multi Jet FusionTM technology", Technical white paper, Nov. 2015, 8 pages http://www8.hp.com/h20195/v2/GetDocument.aspx?docname=4AA5-5472ENW.

(Continued)

*Primary Examiner* — Matthew J Daniels
*Assistant Examiner* — Paul Spiel
(74) *Attorney, Agent, or Firm* — HP Inc. Patent Department (57) ABSTRACT

Certain examples described herein relate to preparing a base of build material for additive manufacturing. The base is formed from layers of build material that do not form part of an object undergoing additive manufacture. The base is heated by the application of energy, for example using a radiation source. A thermal profile of the base is measured after heating and is used to determine a pattern of application of at least one printing agent to the base. The pattern of application is used to deposit the at least one printing agent upon the base, wherein the presence of the printing agent affects the heating of the base. In this way the pattern of application of printing agent may be used to effect a thermal homogeneity of the base.

5 Claims, 3 Drawing Sheets

(51) Int. Cl.
*B33Y 50/02* (2015.01)
*B29C 64/165* (2017.01)
*B29C 64/386* (2017.01)
*B33Y 30/00* (2015.01)
*B29C 64/209* (2017.01)

(52) U.S. Cl.
CPC ............ *B29C 64/386* (2017.08); *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 9,027,378 B2 | 5/2015 | Crump et al. | |
| 2007/0241482 A1* | 10/2007 | Giller | B29C 64/165 264/494 |
| 2014/0371895 A1 | 12/2014 | Sadusk et al. | |
| 2015/0367415 A1* | 12/2015 | Buller | B22F 3/105 419/53 |

FOREIGN PATENT DOCUMENTS

| | | |
|---|---|---|
| WO | WO 2015108546 | 7/2015 |
| WO | WO 2015108547 | 7/2015 |
| WO | WO-2015167520 | 11/2015 |
| WO | WO 2016072966 | 5/2016 |

OTHER PUBLICATIONS

International Search Report and Written Opinion for International Application No. PCT/EP2016/065728 date Mar. 15, 2017, 15 pages.

* cited by examiner

| Temp | 20 - 90 | 95 - 105 | 110 - 140 | 145 | 150 |
|------|---------|----------|-----------|-----|-----|
| FA   | 3       | 2        | 1         | 0   | 0   |
| DA   | 0       | 0        | 0         | 0   | 0   |

| 155 | 160 | 165 | 170 | 175 | 180 | 185 | >190 |
|-----|-----|-----|-----|-----|-----|-----|------|
| 0   | 0   | 0   | 0   | 0   | 0   | 0   | 0    |
| 10  | 13  | 18  | 24  | 32  | 42  | 56  | 75   |

PREPARING A BASE FOR ADDITIVE MANUFACTURING

BACKGROUND

Additive manufacturing systems, including those commonly referred to as "3D printers" build three-dimensional (3D) objects from selective addition of build material. In an example system, build material is formed in layers in a working area. Chemical agents, referred to as "printing agents", are then selectively deposited onto each layer within the working area. In one case, the printing agents may comprise a fusing agent and a detailing agent. In this case, the fusing agent is selectively applied to a layer in areas where particles of the build material are to fuse together, and the detailing agent is selectively applied where the fusing action needs to be reduced or amplified. For example, a detailing agent may be applied to reduce fusing at an object boundary to produce a part with sharp and smooth edges. Following the application of printing agents, energy is applied to the layer. This fuses particles of build material. The process is then repeated for another layer, such that objects are built from a series of cross-sections.

BRIEF DESCRIPTION OF THE DRAWINGS

Various features of the present disclosure will be apparent from the detailed description which follows, taken in conjunction with the accompanying drawings, which together illustrate, features of certain examples, and wherein.

DETAILED DESCRIPTION

In certain additive manufacturing systems described herein, a base of build material is formed before a 3D object is generated. For example, when using a 3D printer, the base is generated before printing a 3D print job, wherein the print job may define at least one 3D object to be generated and the base is not defined in the print job. The base may be formed from layers of build material, wherein layers associated with cross-sections of a 3D object are laid down upon the base. The layers of the base may be termed "sacrificial" or "foundation" layers, as they do not comprise part of a 3D object undergoing additive manufacture.

Using a base enables an object to be built on a heated surface. Heating the base before building the object provides improved geometrical accuracy and mechanical properties for parts of the object. For example, if the base is "cold", e.g. formed from build material at an ambient temperature, then lower layers of an object built upon this "cold" base (e.g. those in thermal communication with the base) may cool more rapidly than upper layers of the object that are built upon the heated lower layers. This can lead to curling and warping due to temperature differentials between, and across, the layers of an object. In certain cases, this can further lead to a malfunction in the additive manufacturing system.

In certain examples described herein, build quality of objects is improved by providing the base at a minimum temperature, together with a desired level of thermal uniformity across the base. It has been found that reducing temperature variation across the base, and thus providing an upper base layer with a homogeneous thermal profile, enables objects to be produced upon the base with superior properties.

In certain cases, an operation of the additive manufacturing system may be configured, in a start-up or initialization phase, to provide one or more base layers having a desired minimum temperature and a desired level of thermal uniformity. This in turn is achieved by measuring a thermal property of the base, e.g. by measuring a thermal profile or set of temperatures, and using this data in a feedback loop to modify the deposit of at least one printing agent onto the base. Certain examples described herein also enable a minimum temperature and desired temperature uniformity to be reached more quickly than comparative methods that differentially heat each formed base layer (e.g. those that use zoned heating elements). This may lead to fewer "sacrificial" layers being used. This then also reduces build material use and waste.

Figure 1:
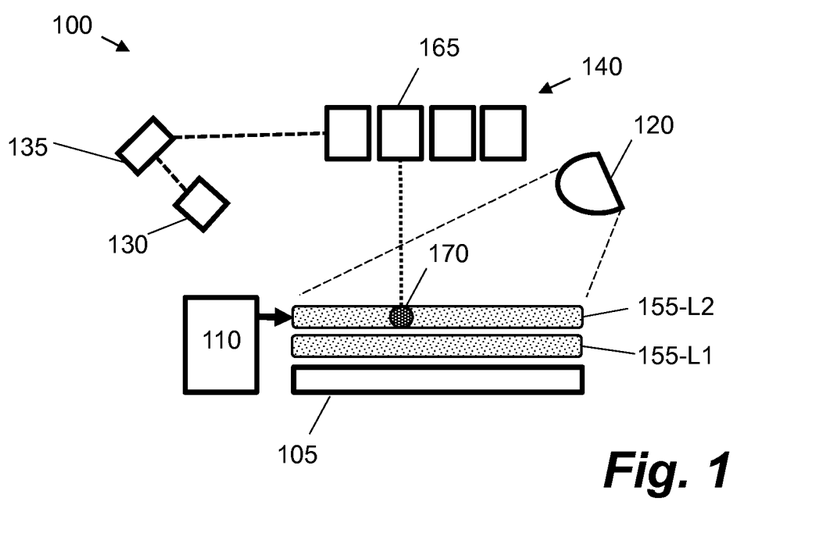
FIG. 1 is a schematic diagram showing build components of an additive manufacturing system according to an example.

FIG. 1 shows an additive manufacturing system 100 according to an example. Although the example of FIG. 1 is provided to better understand the context of the examples described herein, those examples may be applied to a variety of additive manufacturing systems including, amongst others, other inkjet systems. In FIG. 1, the additive manufacturing system 100 comprises a build platform 105, a supply mechanism 110 to form a base of build material upon the build platform 105, a radiation source 120 to heat the base of build material, a thermal sensor 130 to measure a thermal profile of the base, a controller 135 and a printing agent deposit mechanism 140. The printing agent deposit mechanism 140 applies at least one printing agent. In the present example, the controller 135 receives the thermal profile from the thermal sensor 130 and controls application of the at least one printing agent to the base using the printing agent deposit mechanism 140. By selectively applying at least one printing agent to the base, heating of the base may be modified during its construction. Once the thermal profile indicates a homogeneous temperature of the base within a predefined range, the controller 135 is configured to instruct manufacture of a three-dimensional object upon the base. The three-dimensional object may thus be constructed with a reduced risk of curling and warping.

The components shown in FIG. 1 may be used to produce both a base for additive manufacturing and one (or multiple) objects upon the base. For example, the supply mechanism 110 may be configured to supply at least one build material layer. This may form a layer of the base or an object to be produced. At least one printing agent may be deposited on each layer by the printing agent deposit mechanism 140. In FIG. 1, the supply mechanism 110 supplies a powdered build material in successive layers. Two layers are shown in FIG. 1: a first layer 155-L1 upon which a second layer 155-L2 has been formed by the supply mechanism 110. In certain cases, the supply mechanism 110 is arranged to move relative to the build platform 105 such that successive layers are formed on top of each other.

In certain examples, the radiation source 120 may comprise a lamp, for example a short-wave incandescent or infra-red lamp. In other examples, the radiation source 120 may be another light source constructed to emit electromagnetic radiation across a range of wavelengths to heat the base. For example, the radiation source 120 may be a halogen lamp. In certain cases, the additive manufacturing system 100 may comprise additional radiation sources to heat the base. In certain cases, radiation sources may have other uses, e.g. may comprise lighting systems to illuminate the working area or to fuse a build material.

In certain examples, an infra-red "pre-heat" lamp may be used to heat the base. The pre-heat lamp map be located above the build platform 105, e.g. such that it heats at least an upper surface of the base. The pre-heat lamp may be controlled to heat the base to a temperature just below a melting point of the build material. Another radiation source may then be used during construction of a 3D object. For example, in one implementation a separate fusing lamp may be used. The fusing lamp may apply energy to cause fusing of build material on which a fusing agent has been applied.

One or more radiations sources 120 may be moveable relative to the build platform 105. For example, in one implementation a fusing lamp may be carriage-mounted so as to scan across build material that is formed on the build platform 105. In this case, the fusing lamp may be controlled to also scan the base. A base may therefore be heated by both a static infra-red lamp and a scanning fusing lamp. For example, a scanning fusing lamp may be controlled to selectively heat the base, e.g. in areas where a fusing agent has been deposited and/or areas that have an indicated temperature below a predefined threshold. In other examples, a pre-heat lamp may be moveable in relation to the build platform 105; in this case the pre-heat lamp may be selectively applied to areas of the upper surface of the base so as to heat these areas. In certain cases, a pre-heat lamp may not be used, wherein a fusing lamp is used as the radiation source to heat the base. As such temperature stabilization of the base layers may be achieved using at least one pre-heat lamp and/or using at least one fusing lamp.

As noted above, the thermal sensor 130 is configured to measure a thermal profile of the base. The thermal profile may for example comprise a two-dimensional representation of the temperature of an upper surface of the base. The thermal sensor 130 may comprise a thermal imaging camera. In certain cases, a thermal imaging camera may comprise a plurality of infra-red sensors. In one example, the thermal sensor 130 may comprise an array of thermopiles and an optical system such that the infra-red sensor is an infra-red camera. The optical system may comprise a system of lenses such that an infra-red image is formed by the infra-red camera. In such an example, each thermopile may return a value representative of radiation integrated within its spectral window.

In certain examples, including the example of FIG. 1, the printing agent deposit mechanism 140 comprises at least one print head 165 to deposit a fusing agent and a detailing agent, wherein the fusing agent increases heating of the base and the detailing agent reduces heating of the base. For example, the printing agent deposit mechanism 140 may comprise an inkjet deposit mechanism for printing a plurality of printing agents onto layers of powdered build material 155. In this case, an inkjet print head may be adapted to deposit one (or multiple) printing agents onto layers of powdered polymer build material that form the base. In certain cases, each print head within the inkjet deposit mechanism may be arranged to deposit a particular printing agent upon defined areas within a plurality of successive build material layers.

A fusing agent (sometimes also referred to as a "coalescing agent") may increase heating of the base by acting as an energy absorbing agent that causes build material on which it has been deposited to absorb more energy (e.g. from the radiation source 120) than build material on which no agent has been deposited. This may cause build material to heat up. When heating the base, a desired temperature for the base may be below a fusing temperature of the build material. Hence, application of fusing agent causes heating of the base but does not cause melting and fusing of the build material. However, when constructing a 3D object, build material may be heated above the fusing temperature, and the fusing agent may act to cause the build material to melt, coalesce or fuse, and then solidify after cooling. In this manner, solid parts of the 3D object may be constructed.

A detailing agent (sometimes also referred to as a "modifying agent") may act to modify the effect of a fusing agent and/or act directly to cool build material. When heating the base, a detailing agent may thus be applied to reduce a heating effect of previously applied fusing agent and/or to directly reduce the temperature of the build material. When constructing a 3D object, a fusing agent may be used to form sharp object edges by inhibiting a fusing agent outside of an object boundary and thus preventing solidification in exterior areas of a cross-section. During construction of an object, a detailing agent may also be used to prevent thermal bleed from a fused area to a non-fused area and to prevent fusing in certain "blank" or "empty" portions of an object (e.g. internal cavities). At the end of production of an object, unfused build material may be removed to reveal the completed object.

In the present example, the controller 135 is configured to determine a pattern of application for at least one printing agent to provide a desired uniform thermal profile given data from the thermal sensor, e.g. data in the form of a thermal profile or set of temperature measurements. The pattern of application may be based on a mapping between a measured temperature of an area of the base and an amount of printing agent to deposit.

In one case, a pattern of application may comprise deposit instructions for application of fusing agent to regions of an upper base layer with a temperature below a desired temperature. For example, thermal sensor 130 may supply a two-dimensional array or "heat map" of the upper surface of the base at one point in time. Each element in the two-dimensional array, i.e. each "pixel" in the heat map, may indicate a temperature measurement for a particular two-dimensional area of the upper surface. This temperature measurement may then be mapped to a quantity of fusing agent to deposit in that particular area. For example, a desired minimum temperature for the base may be defined. An amount of fusing agent to deposit may be determined based on a difference between the measured temperature for the area and the desired minimum temperature, if the measured temperature is below the desired minimum temperature. As described above, application of fusing agent to a particular area of the upper surface of the base causes build material within that area to absorb more energy and thus raises the temperature of the area.

Alternatively or additionally, the pattern of application may comprise deposit instructions for application of detailing agent to regions of an upper base layer with a temperature above a desired temperature. For example, thermal sensor 130 may again supply a two-dimensional array or "heat map" of the upper surface of the base at one point in time. A temperature measurement for a particular array element or pixel may then be mapped to a quantity of detailing agent to deposit in that particular area. An amount of detailing agent to deposit may be determined based on a difference between the measured temperature for the area and the desired minimum temperature, if the measured temperature is above the desired minimum temperature. As described above, application of detailing agent to a particular area of the upper surface of the base causes a reduction in heating and/or a cooling of the area.

In certain cases, a detailing agent may be applied to slow down a rate of heating even if a measured temperature for an area is below the desired temperature. For example, based on a plurality of thermal profiles a rate of heating for an area of the base may be determined. If the rate of heating indicates that a particular area may have a temperature above a desired minimum temperature at a time when other areas still have temperatures below the desired minimum temperature, then the rate of heating for that area may be reduced by applying detailing agent.

In certain implementations, fusing agent and detailing agent may be applied based on whether a measured region is respectively below or above a predefined temperature. As the printing agents are applied selectively across two-dimensions then different amounts of printing agents may be applied in different areas of the upper surface of the base. This then helps reduce any measured temperature differentials across the surface of the base. The process may be iterated to converge on a predefined minimum temperature, e.g. printing agents may be applied to success base layers until any differences in region temperatures from the predefined minimum temperature are within a predefined range (e.g. plus or minus two degrees Celsius).

In certain implementations, the controller 135 may be configured to determine the pattern of application based on a look-up table. The look-up table may provide, for a given spatial element of the surface of the base, a relationship between a measured print-bed temperature and corresponding deposit levels of a printing agent. An example of such a look-up table is discussed below with reference to FIG. 5.

In these cases, the printing agent deposit mechanism 140 is configured to apply at least one printing agent in accordance with the pattern of application determined by the controller 135. In one case, the controller 135 may be configured to control deposit of a fusing agent with one print head and to control deposit of a detailing agent with another print head. In another case, the controller 135 may be configured to control deposit of fusing agent and detailing agent with the same print head. FIG. 1 shows a particular print head 165 depositing a controlled amount of a printing agent onto an addressable area 170 of the second layer 155-L2 of powdered build material.

Application of the at least one printing agent affects the heating of the build material forming the base. Where the printing agent is a fusing agent, the quantity of fusing agent applied is insufficient to cause the build material to fuse as occurs when constructing an object (as described above). However, the fusing agent causes the build material to heat more rapidly than areas of build material to which no fusing agent is applied. Conversely, as described above, detailing agent may be applied to inhibit the action of the fusing agent in, or directly cool, areas of the layers 155 which exceed the desired temperature, such that the temperature of these areas is reduced. As such, the layers 155 may achieve the desired temperature level and temperature uniformity more rapidly.

Figure 2:
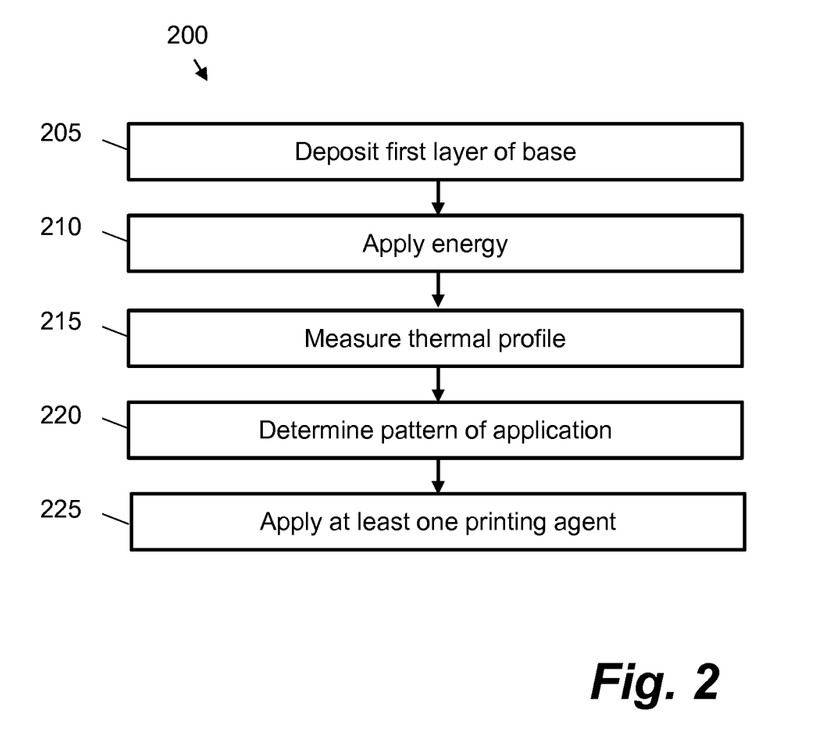
FIG. 2 is a flowchart showing a method of preparing a base for additive manufacturing according to an example.

FIG. 2 is a flowchart showing a method 200 of preparing a base for additive manufacturing according to an example. In this case, the base does not comprise part of a three-dimensional object undergoing additive manufacture. At block 205, a first layer of the base is formed from build material. This first layer may be formed on a build platform (e.g. on 105 in FIG. 1) or a previously formed layer of build material (e.g. on layer 155-L1 in FIG. 1). As described above, the first layer does not comprise part of a three-dimensional object undergoing additive manufacture, i.e. is a "sacrificial" or "foundation" layer.

At block 210, energy is applied to heat the base. The energy may for example be applied to the upper surface of the first layer by a radiation source 120 as described above. The radiation source may be the same radiation source as is used to cause fusing of build material during additive manufacture or may comprise a different radiation source (e.g. a pre-heat lamp). The radiation source may be static or may be moveable in relation to the base, e.g. may selectively scan above the base.

At block 215, a thermal profile of the base is measured. The thermal profile may for example comprise a two-dimensional representation of the temperature of the upper surface of the base as a function of position, for example expressed as a temperature T (e.g. in Celsius) at associated Cartesian x-y coordinates (e.g. in micrometers). This two-dimensional representation may comprise an array or an "image" of the upper surface of the base, wherein values within the array or pixels within the image are representative of the measured temperature. In other examples, the thermal profile may comprise a relative measurement, e.g. a difference in temperature between two areas and/or a difference between a measured temperature and a desired minimum temperature.

At block 220, a pattern of application of at least one printing agent is determined based on the measured thermal profile. This may comprise applying a mapping function to temperature values associated with areas of the upper surface of the base. A mapping function may be implemented as a look-up table. The pattern of application is determined to effect a thermal homogeneity of the base, e.g. to produce a change in the thermal properties of the base to work towards a uniform, minimum base temperature.

At block 225, the at least one printing agent is applied to the base, e.g. an upper surface or layer of the base, according to the pattern of application. This increases thermal homogeneity of the base. For example, the pattern of application may direct application of a fusing agent to cause greater heating of cooler areas of the base than of warmer areas of the base. Similarly, warmer area of the base may be cooled, or a rate of heating may be reduced, by applying a detailing agent. In one case, a pattern of application may indicate the amount and type of printing agent that needs to be applied in a set of base regions or areas to move towards a desired minimum temperature. This may be calculated based on the magnitude and sign of a difference in temperature in a region or area as compared to a minimum desired temperature, or it may be calculated by looking up values in a lookup table using a measured temperature (or temperature range) from the thermal profile as an index.

Figure 3:
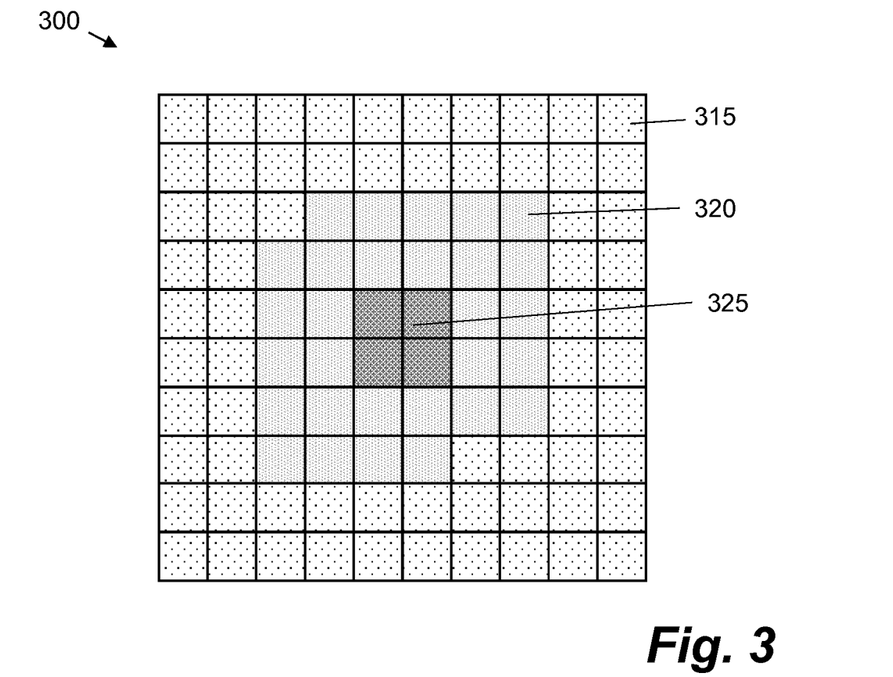
FIG. 3 is a schematic representation of a thermal profile according to an example.
Figure 4:
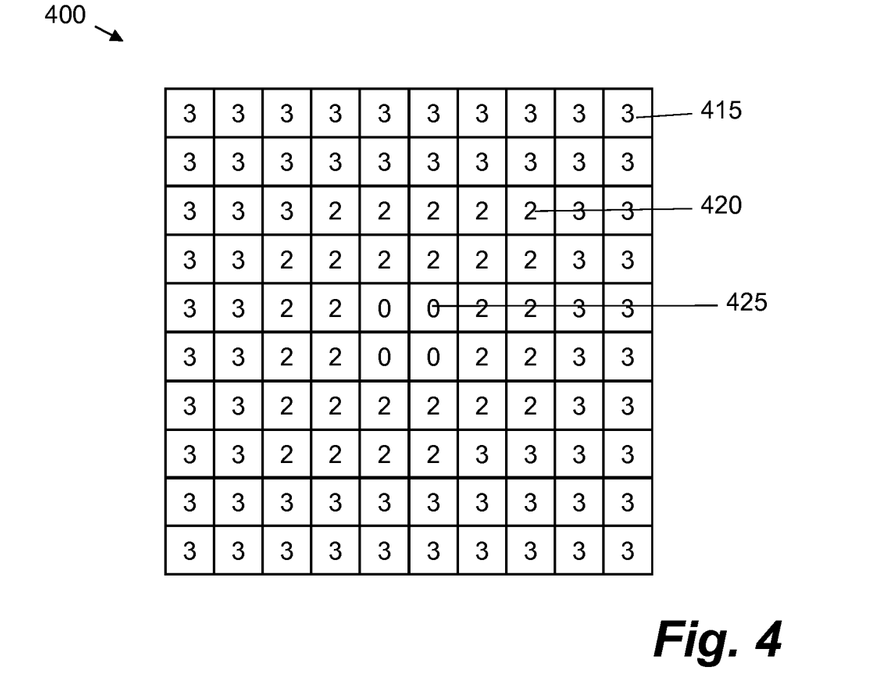
FIG. 4 is a schematic representation of a pattern of application for at least one printing agent according to an example.

FIGS. 3 and 4 show examples of a thermal profile and pattern of application. FIG. 3 shows a schematic representation of an example thermal profile 300, where darker shading indicates areas of the base having a higher temperature. A region 315 has the lowest temperature, a region 320 has a medium temperature, and a region 325 has the highest temperature. The base may be expected to have higher temperature in more central regions, as exterior regions may typically dissipate heat more rapidly to the surroundings.

FIG. 4 shows a schematic representation of a pattern of application 400 corresponding to the thermal profile 300 shown in FIG. 4. Each element in the pattern of application is associated with a printable area of an upper surface of a base of build material. Each element indicates the number of drops of printing agent to deposit in the printable area. In this case, elements 415 direct deposit of three drops of fusing agent. The pattern of application 400 thus results in greater heating of a region corresponding to the region 315 of lowest temperature. Elements 420 then direct deposit of two drops of fusing agent to cause medium heating of a region of the upper surface of the base corresponding to the region 320 of medium temperature. Lastly, in this simple example, elements 425 do not direct deposit of any printing agent (zero drops) in a region corresponding to the region 325 of lowest temperature. For example, region 325 may be at a predefined minimum temperature. If region 325 was above a predefined minimum temperature, then elements 425 may instruct deposit of at least one drop of detailing agent to reduce heating or cool the region 325. Alternatively, if a rate of heating of region 325 indicated that this region would overshoot the predefined minimum temperature before one of regions 315 or 320 reached this temperature, then detailing agent may be applied to reduce a rate of heating. Hence, as described above, heating in this example is affected via proportional application of at least one printing agent.

Returning to FIG. 2, in one case, block 225 may comprise forming a second layer of the base from build material. In this case, the second layer may be formed on top of the first layer, e.g. powdered build material may be deposited upon or swept across the upper surface of the first layer of the base. The second layer also does not comprise part of the three-dimensional object (e.g. is also a "sacrificial" layer). In this case, the at least one printing agent is applied to the second layer based on the pattern of application. The pattern of application may be in the form shown in FIG. 4 or be determined area by area using the look-up table of FIG. 5. Energy is then applied to heat the base, wherein the heating is affected by the deposit of the printing agent in a manner to increase thermal uniformity of the base, e.g. as measured from the upper surface of the second layer. In other cases, the pattern of application may be used to apply at least one printing agent to the upper surface of the first layer. The first layer may then be heated again.

In one example, the heating is a discrete process carried out at relevant times, for example at block 210. In certain examples, the energy may be applied by a heating element that is also used to fuse the three-dimensional object. In other examples, the energy is applied continuously, for example by a dedicated energy source such as a lamp for providing stable background temperature.

In the method of FIG. 2, one of the at least one printing agents may be a fusing agent as described above, wherein presence of fusing agent in areas of build material causes increased absorption of energy. The pattern of application may then direct deposit of fusing agent to an area of a second layer corresponding to an area of the first layer with a temperature below a predefined threshold. The predefined threshold may for example be the minimum temperature described above.

In some examples, the pattern of application directs application, to the area of the second layer, of an amount of fusing agent in proportion to a difference between the predefined threshold and the temperature for the corresponding area of the first layer. The predefined threshold may comprise a temperature below a fusing temperature of the build material, as described above. For example, the thermal profile may indicate an area of the first layer, with given x-y coordinates, to have temperature a certain amount below the predefined threshold. The pattern of application may then direct application, to an area of the second layer with the same x-y coordinates, of an amount of fusing agent in proportion to that certain amount. An effect of this is that cooler areas of the base absorb more energy than warmer areas, which facilitates the achievement of a uniform base temperature at the predefined threshold temperature. The pattern of application may direct application of no fusing agent to areas of the base with temperature near or at the predefined threshold.

One of the at least one printing agents may be a detailing agent as described above, wherein presence of detailing agent in areas of build material inhibits the action of the fusing agent, reduces a rate of heating or directly cools the build material. In one case, the detailing agent may comprise water or another liquid at a lower temperature than a heated upper surface of the base. The pattern of application may then direct application of detailing agent to an area of a second layer corresponding to an area of the first layer with a temperature below the predefined threshold, analogously as described above in relation to fusing agent. In some examples, both a fusing agent and a detailing agent may be used, e.g. a fusing agent may be used to heat certain areas and a detailing agent may be used to cool other areas.

Analogously to the description above for the fusing agent, the pattern of application may direct application, to the area of the second layer, of an amount of detailing agent in proportion to a difference between the predefined threshold and the temperature determined for the corresponding area of the first layer. As described above, the predefined threshold may comprise a temperature below a fusing temperature of the build material.

Figure 5:
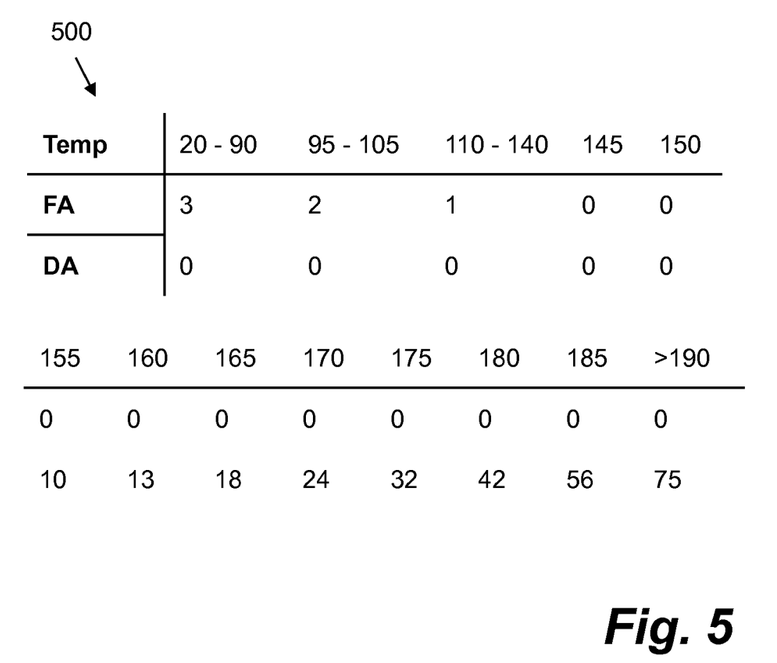
FIG. 5 is a look-up table for generating a pattern of application according to an example.

The pattern of application may comprise or be computed using a look-up table. FIG. 5 shows a schematic example 500 of such a look-up table. The look-up table 500 shows levels of fusing agent (FA) and detailing agent (DA) to be applied to an area of the base, as a function of temperature in degrees Celsius of that area.

In the example of FIG. 5, the predefined threshold (i.e. desired minimum temperature) is 150° C. In this case a uniform base temperature of 150° C. reduces build artifacts, and ensures good build quality, in objects built on top of the base. It can be seen that fusing agent is applied to areas of the base with temperatures below 150° C., and detailing agent is applied to areas of the base with temperatures above 150° C., as described above. As shown in FIGS. 3 and 4, an upper surface of the base may be represented as a matrix of cells, for example square areas with a side length of 42 micrometres. In FIG. 5, the quantities of fusing agent and detailing agent are expressed in arbitrary units from 0 to 255, where 0 represents zero drops of printing agent per cell and 255 represents four drops of printing agent per cell. This quantity value may be used by the controller 135 to direct deposit of a printing agent using the printing agent deposit mechanism 140. In some examples, an integer number of drops of printing agent is applied to each cell. In such examples, where the table 500 does not indicate an integer number of drops, the application of printing agents may be determined as an average. For example, a value of 2 may indicate that one drop of printing agent should be applied to each of two cells out of every 64 cells, and no printing agent should be applied to the remaining 62 cells. The specific cells to which printing agent should be applied may be determined using known halftoning algorithms.

In some examples, the method 200 is repeated until the thermal profile indicates that the temperature of the base (i.e. a temperature of an upper surface or layer of the base) is homogeneous within at least one predefined range. For example, the method may be repeated until the base is homogeneous within 2° Celsius (i.e. each measured area has a temperature equal to the predefined minimum temperature plus or minus 2° Celsius). This range may be selected to reduce the negative effects of inhomogeneity, as described above, to an acceptable level. The method 200 may allow significantly faster achievement of similar temperature ranges to those achieved in comparative methods, e.g. to those that simply control an energy level of a radiation source. For example, the method 200 may allow a degree of homogeneity after three to five layers comparable to that achieved by comparative method after several hundred layers. This may result in a reduction in build material as well as usage of the energy source and the time to prepare for manufacturing a three-dimensional object. Alternatively, the method 200 may allow a significantly greater degree of homogeneity than that achieved by comparative methods, after forming and heating a comparable number of layers. In general, the method provides for controlled, precise and predictable increasing or decreasing of the temperature of specific areas of the base.

After achieving a desired minimum temperature and thermal uniformity, the method 200 may then comprise manufacturing the three-dimensional object upon the base, i.e. upon the layers that do not comprise part of the three-dimensional object.

Figure 6:
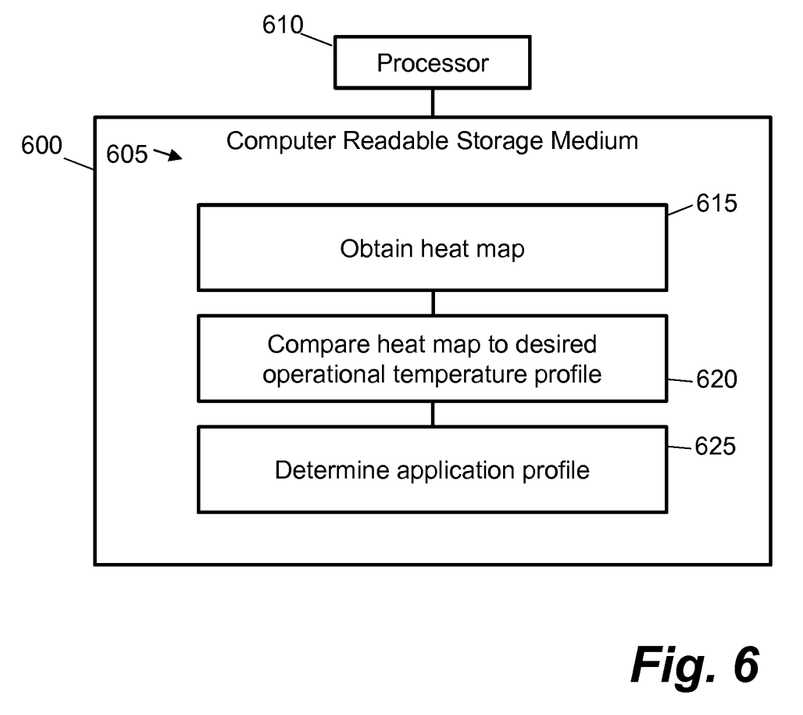
FIG. 6 is a schematic diagram showing an example set of set of computer-readable instructions within a non-transitory computer-readable storage medium.

FIG. 6 shows an example of a non-transitory computer-readable storage medium 600 comprising a set of computer readable instructions 605 which, when executed by at least one processor 610, cause the processor 610 to perform a method according to examples described herein. The method may be applied during formation of a base, prior to construction of a three-dimensional object. The processor 610 may form part of the controller 135 in FIG. 1. The computer readable instructions 605 may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random access memory (RAM), a read-only memory (ROM), an erasable programmable read-only memory, or a portable disc.

In an example, instructions 605 cause the processor 610 to, at block 615, obtain a two-dimensional heat map of an upper surface of the base. At block 620, instructions 605 cause the processor 610 to compare the heat map to an operational temperature profile for the base. For example, the operational temperature profile may indicate a desired temperature for the base, e.g. an acceptable range of temperatures for the upper surface of the base.

At block 625, the instructions 605 cause the processor 610 to, based on the comparison, instruct selective application of at least one printing agent over the upper surface of the base. Application of the at least one printing agent onto a layer of build material affects the heating of the build material forming the base, e.g. in the presence of a radiation source, as described above. In one case, the printing agent may cool areas of the upper surface of the base to lower the temperature towards an operational temperature. In another case, the printing agent may accelerate heating of areas of the upper surface of the base to raise the temperature towards an operational temperature. Multiple printing agents may also be used to respectively lower and raise the temperatures of different addressable areas of the base. The instructions 605 may be repeated for multiple base layers until a predefined temperature is reached, e.g. within an acceptable tolerance.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method of preparing a base for additive manufacturing, wherein the base does not comprise an intended part of a three-dimensional object undergoing additive manufacture, the method comprising:
  forming a first layer of the base from an unfused build material;
  forming a second layer of the base from the unfused build material on the first layer;
  measuring a thermal profile of the unfused build material in the first layer of the base;
  based on the thermal profile, determining a pattern of application of a fusing agent to effect a thermal homogeneity of the unfused build material in the first layer of the base;
  depositing the fusing agent on to the unfused build material in the second layer of the base according to the pattern of application of the fusing agent; and
  applying energy to heat the unfused build material in the second layer of the base on which the fusing agent has been deposited to a temperature below a fusing temperature of the unfused build material.

2. The method of claim 1, wherein:
  the pattern of application of the fusing agent directs depositing the fusing agent to an area of the second layer of the base that corresponds to an area of the first layer of the base with a temperature below a predefined threshold that is below the fusing temperature of the unfused build material.

3. The method of claim 2, wherein:
  the pattern of application of the fusing agent directs depositing, to the area of the second layer, an amount of the fusing agent in proportion to a difference between the predefined threshold and a temperature in the thermal profile for the corresponding area of the first layer.

4. The method of claim 1, comprising:
  based on the thermal profile, determining a pattern of application of a detailing agent to effect a thermal homogeneity of the unfused build material in the first layer of the base;
  depositing the detailing agent on to the unfused build material in the second layer of the base according to the pattern of application of the detailing agent; and
  wherein the detailing agent reduces a temperature of the unfused build material in the first layer of the base.

5. The method of claim 1, comprising:
repeating the forming, forming, measuring, determining, depositing and applying for subsequent layers of unfused build material to form the base; and
manufacturing the three-dimensional object upon the base.

* * * * *